(12) United States Patent
Ito et al.

(10) Patent No.: US 7,267,276 B2
(45) Date of Patent: Sep. 11, 2007

(54) METHOD AND APPARATUS FOR OPTICALLY READING TARGET WHILE FOLDING REFLECTED LIGHT

(75) Inventors: Kunihiko Ito, Chiryu (JP); Hisashi Shigekusa, Okazaki (JP)

(73) Assignee: Denso Wave Incorporated, Tokyo (JP)

( * ) Notice: Subject to any disclaimer, the term of this patent is extended or adjusted under 35 U.S.C. 154(b) by 339 days.

(21) Appl. No.: 10/959,961

(22) Filed: Oct. 8, 2004

(65) Prior Publication Data
US 2005/0077360 A1 Apr. 14, 2005

(30) Foreign Application Priority Data
Oct. 10, 2003 (JP) ............................. 2003-352216

(51) Int. Cl.
*G06K 7/10* (2006.01)
*G06K 7/14* (2006.01)

(52) U.S. Cl. ............ 235/454; 235/462.36; 235/462.37; 235/462.23; 235/462.24; 359/223; 250/234

(58) Field of Classification Search ........... 235/462.22, 235/462.23, 462.24, 462.35, 462.36, 462.37, 235/462.41; 359/223, 225
See application file for complete search history.

(56) References Cited

U.S. PATENT DOCUMENTS

| | | | |
|---|---|---|---|
| 5,185,822 A * | 2/1993 | Miura | 382/255 |
| 5,198,648 A * | 3/1993 | Hibbard | 235/462.24 |
| 5,616,909 A * | 4/1997 | Arackellian | 235/462.22 |
| 5,912,447 A * | 6/1999 | Bjorner et al. | 235/454 |
| 6,068,189 A * | 5/2000 | Mazzone | 235/462.23 |
| 6,206,527 B1 * | 3/2001 | Suzuki | 359/858 |
| 6,634,554 B1 * | 10/2003 | Merchant | 235/462.23 |
| 6,801,260 B1 * | 10/2004 | Veksland et al. | 348/345 |
| 6,966,494 B2 * | 11/2005 | Nuebling | 235/462.36 |
| 7,026,606 B2 * | 4/2006 | Hecht et al. | 250/234 |

FOREIGN PATENT DOCUMENTS

| GB | 2 354 361 A | 3/2001 |
|---|---|---|
| JP | 7-319990 | 12/1995 |

OTHER PUBLICATIONS

First Office Action from Chinese Patent Office issued on Nov. 24, 2006 for the corresponding Chinese patent application No. 200410103811.0 (a copy and English translation thereof).

* cited by examiner

*Primary Examiner*—Jared J. Fureman
(74) *Attorney, Agent, or Firm*—Posz Law Group, PLC

(57) ABSTRACT

In an apparatus for optically reading a target based on light reflected from the target, an imaging lens with a first optical axis is provided so that the reflected light enters into the imaging lens. A photodetector having an active area and a second optical axis different from the first optical axis is provided. The imaging lens focuses the reflected light on the active area of the photodetector. A fold mechanism is arranged between the imaging lens and the photodetector. The fold mechanism folds an optical path of the reflected light between the imaging lens and the photodetector to adjust a length of the optical path while keeping each of the first and second optical axes constant.

12 Claims, 10 Drawing Sheets

METHOD AND APPARATUS FOR OPTICALLY READING TARGET WHILE FOLDING REFLECTED LIGHT

CROSS REFERENCE TO RELATED APPLICATION

This application is based on Japanese Patent Application 2003-352216 filed on Oct. 10, 2003 and claims the benefit of priority therefrom, so that the descriptions of which are all incorporated herein by reference.

BACKGROUND OF THE INVENTION

1. Field of the Invention

The present invention relates to a method and an apparatus for optically reading a target, such as information.

2. Description of the Related Art

A conventional handheld optical information reader aims at reading, as a target, information that is optically readable, such as a barcode, a two-dimensional code, or other similar codes. The optical information reader has a handheld body case, a photodetector, an imaging unit with an imaging lens, and a reading unit composed of a lighting device. The photodetector, the imaging unit, and the reading unit are installed in the body case, respectively.

In the optical information reader, light is supplied from the lighting device through a reading window formed at one end portion, that is, a head portion, of the body case. The light is irradiated to a target, such as a barcode. Light reflected from the target based on the irradiated light is entered through the reading window into the imaging unit. The light entered into the imaging unit is focused on the photodetector by the imaging lens to be imaged thereon, so that an image corresponding to the target is picked up by the photodetector.

In the above optical reading structure of the optical information reader, the range of a reading distance defined as a distance between the reading window and a target that is readable by the optical information reader is previously determined depending on an optical characteristic of the imaging unit, such as a focal length of the imaging lens. A user, therefore, handles the body case of the optical information reader to locate it so that the reading window of the body case is positioned at the reading distance from the target or adjacent to the reading distance and the reading window is opposite to the target. After the positioning of the reading window of the body case of the optical information reader, the reading operations of the target set forth above are started.

For expanding the range of a reading distance, an optical information reader having a mechanism capable of sliding the imaging lens to adjust a focal point of the imaging lens has been created in recent years.

An example of the optical information reader with the focal point adjusting mechanism is disclosed in Japanese Unexamined Patent Publication No. H7-319990.

In the disclosed optical information reader, a focal point adjusting mechanism composed of a ball thread mechanism and a stepping motor is provided. The ball thread mechanism and the stepping motor are designed to slide a focal lens linearly along an optical axis of the focal lens to adjust a focal point of the focal lens.

The structure and adjusting operations of the disclosed focal-point adjusting mechanism may be comparatively complicated. Especially, the linearly sliding structure of the focal lens may cause the focal-point adjusting mechanism itself to be complicated and upsized. The slide portion of the focal-point adjusting mechanism, such as the focal lens, may be comparatively heavy, resulting in a delay of the sliding response of the slide portion.

SUMMARY OF THE INVENTION

The present invention is made on the background so that preferable embodiments of optical reading apparatuses of the present invention each can be designed to have a simple structure to wide the range of a reading distance thereof.

According to one aspect of the present invention, there is provided an apparatus for optically reading a target based on light reflected from the target. In the apparatus, an imaging lens with a first optical axis is composed so that the reflected light enters into the imaging lens. In the apparatus, a photodetector having an active area and a second optical axis different from the first optical axis is composed. The imaging lens focuses the reflected light on the active area of the photodetector. In the apparatus, a fold mechanism is composed. The fold mechanism is arranged between the imaging lens and the photodetector and configured to fold an optical path of the reflected light between the imaging lens and the photodetector to adjust a length of the optical path while keeping each of the first and second optical axes constant.

According to another aspect of the present invention, there is provided an apparatus for optically reading a target based on light reflected from the target. In the apparatus, an imaging lens with a first optical axis is composed so that the reflected light enters into the imaging lens. In the apparatus, a photodetector having an active area and a second optical axis is composed. The imaging lens focuses the reflected light on the active area of the photodetector. In the apparatus, a plurality of reflectors is composed. The plurality of reflectors are arranged between the imaging lens and the photodetector. Each of the reflectors folds an optical path of the reflected light between the imaging lens and the photodetector. In the apparatus, an adjusting mechanism is composed. The adjusting mechanism is configured to adjust a length of the optical path of the reflected light between the imaging lens and the photodetector while keeping each of the first and second optical axes constant.

According to a further aspect of the present invention, there is provided a method of optically reading a target based on light reflected from the target. The reflected light enters into an imaging lens with a first optical axis so that the imaging lens focuses the reflected light on an active area of a photodetector having a second optical axis. In the method, an optical path of the reflected light between the imaging lens and the photodetector is folded so that a length of the optical path of the reflected light between the imaging lens and the photodetector is adjusted while each of the first and second optical axes are kept constant.

BRIEF DESCRIPTION OF THE DRAWINGS

Other objects and aspects of the invention will become apparent from the following description of embodiments with reference to the accompanying drawings in which.

DETAILED DESCRIPTION OF EMBODIMENTS OF THE INVENTION

Embodiments of the present invention will be described hereinafter with reference to the accompanying drawings. In the embodiments, the invention is applied to a handheld two-dimensional code reader.

Figure 1:
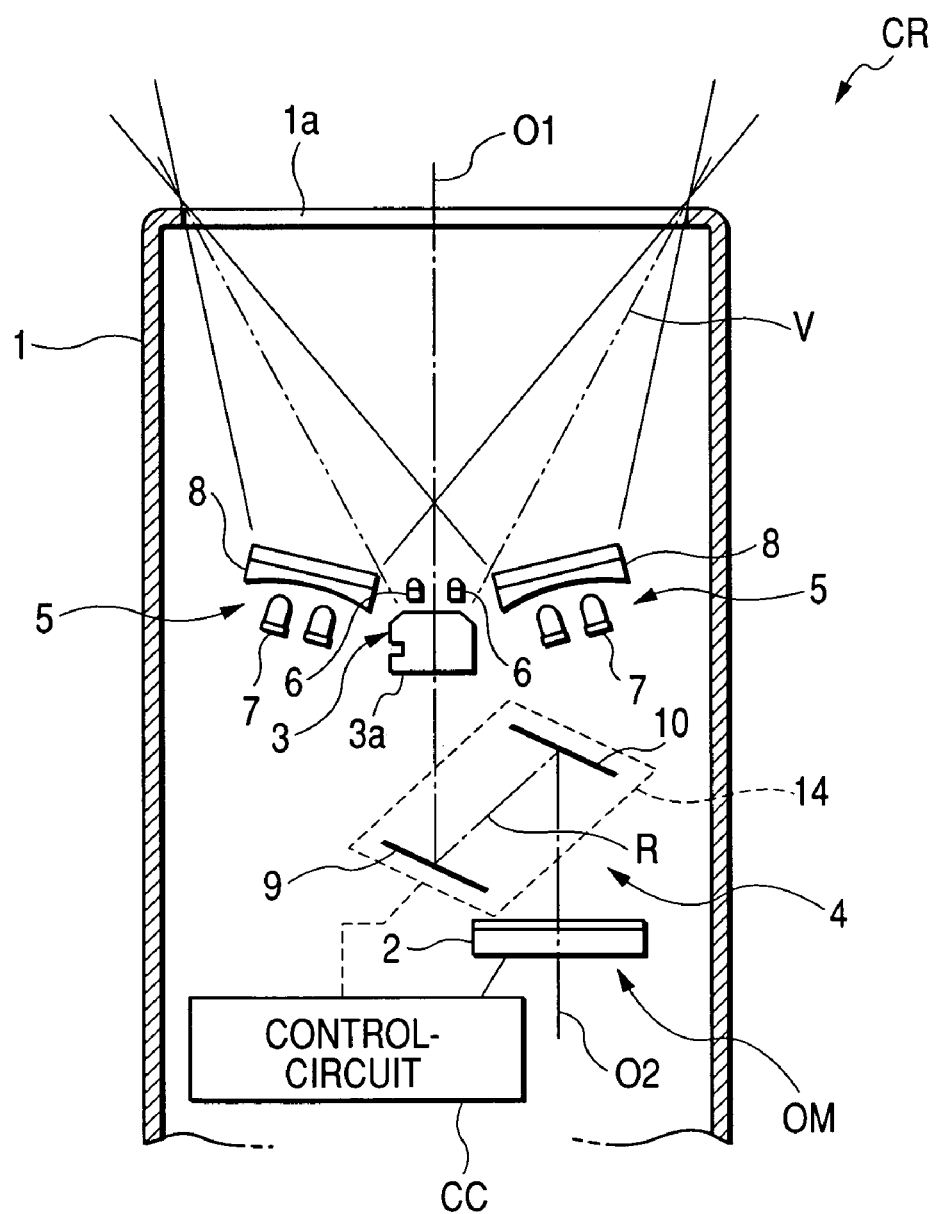
FIG. 1 is a partially cross sectional view schematically illustrating a structure of an optical information reader according to a first embodiment of the present invention.
Figure 2:
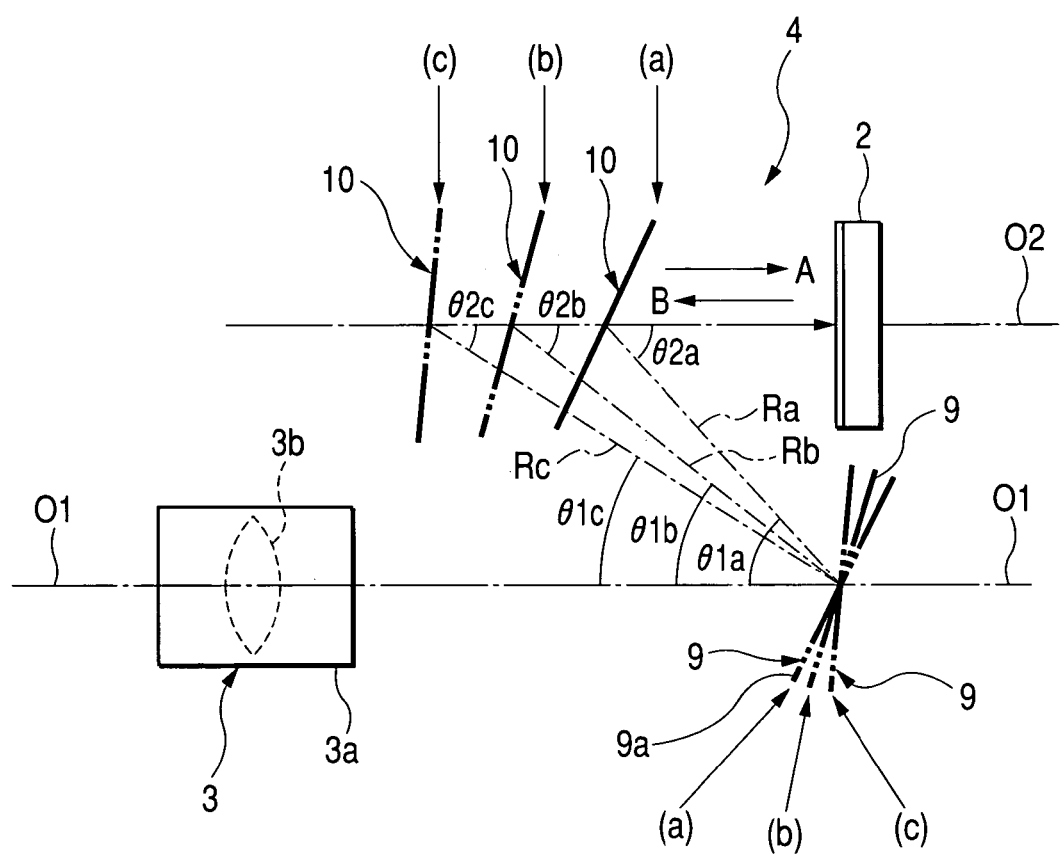
FIG. 2 is a view schematically illustrating a structure of a focal point adjusting mechanism shown in FIG. 1.

As shown in FIG. 1, the two-dimensional code reader CR as an apparatus for optically reading a target according to a first embodiment of the present invention is provided with a handheld body case 1 having, for example, a rectangular parallelepiped shape and a size that allows a user to handle in one hand.

The two-dimensional code reader CR is provided with an optical mechanism (optical reading mechanism) OM disposed in one lateral end side of the body case 1. In the first embodiment, the one lateral end side of the body case 1 is referred to as "head side". The optical mechanism OM is operative to read a two-dimensional code Q, such as a QR code, written on a target by printing or other similar methods. As the target, a label P that is a piece of paper or another media can be used (see FIGS. 3A-3C). The label can be attached on goods, which is the same as general barcodes. The two-dimensional code Q includes information, such as, a manufactures serial number, a name, a unique identification number and a date of manufacture of the goods.

The body case 1 is formed at the one lateral end wall with a reading window 1a having, for example, a rectangular shape and translucency. The two-dimensional code reader CR is provided with a control circuit CC electrically coupled to the optical mechanism OR, a communication circuit (not shown) electrically coupled to the control circuit CC, a secondary battery (not shown) serving as a drive power supply for the optical mechanism OR, the control circuit CC, the communication circuit, and the like.

The control circuit CC is operative to control the whole of the two-dimensional code reader CR and to perform decoding processes. The communication circuit is operative to communicate with an external circuit of the two-dimensional code reader CR. The two-dimensional code reader CR is provided at an outer surface of one longitudinal sidewall of the case 1 with a display and a key operation unit, which are electrically coupled to the control circuit CC. The display is operative to display information sent from the control circuit CC. The key operation unit allows a user of the two-dimensional code reader CR to enter information to the control circuit CC.

Figure 5:
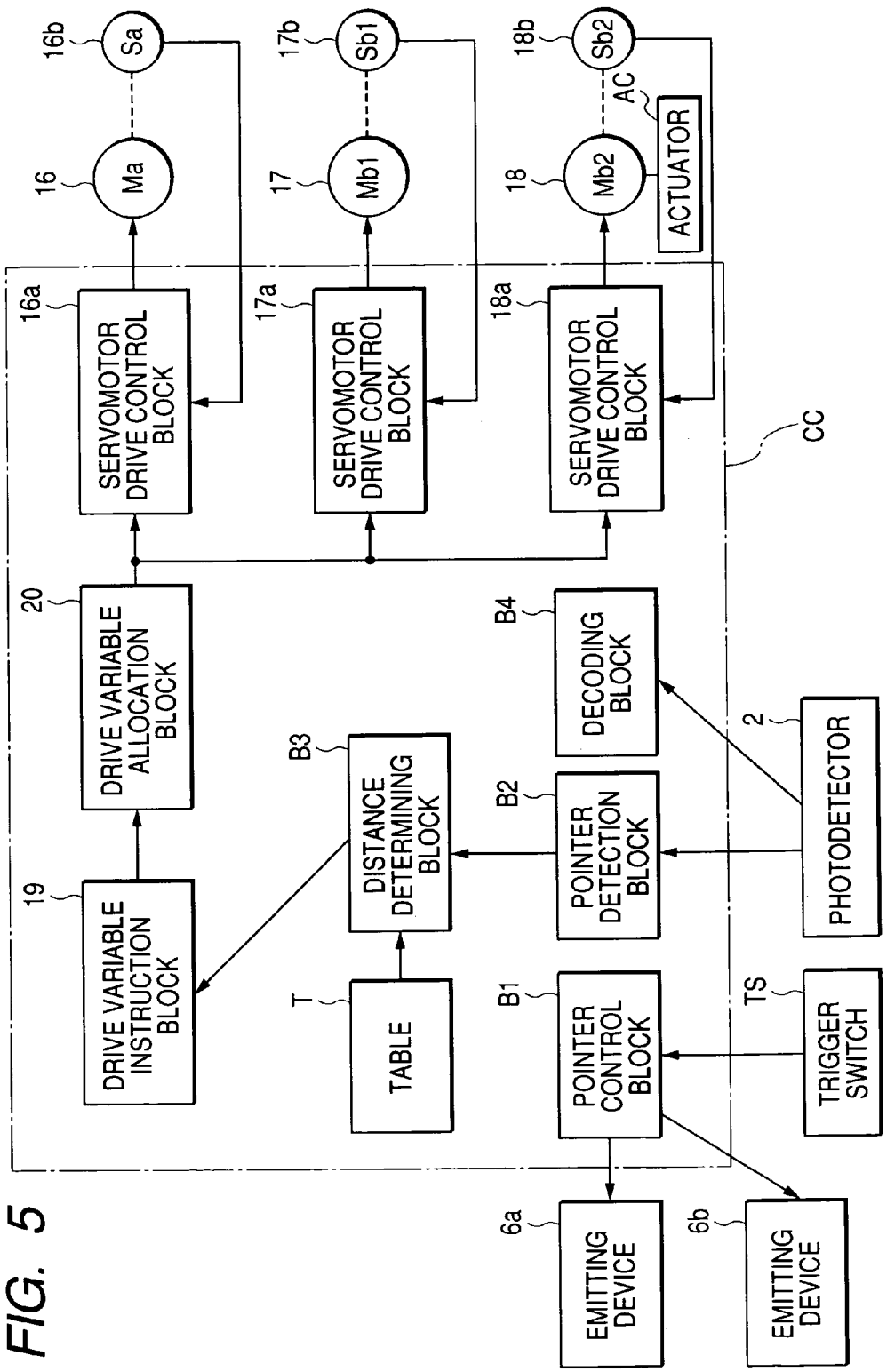
FIG. 5 is a functional block diagram of a control circuit shown in FIG. 1 according to the first embodiment.

The two-dimensional code reader CR is also provided with a trigger switch TS, which is illustrated as a functional block in FIG. 5, disposed at an outer surface of another longitudinal sidewall of the case 1. The trigger switch allows the user to instruct a measurement operation and a reading operation to the control circuit CC. Preferably, the trigger switch is designed to allow the user to push it in different first and second strokes.

That is, when the user pushes the trigger switch in the first stroke, such as in half stroke, the instruction to perform the measurement operation is sent to the control circuit CC so that the control circuit CC performs the measurement operations described hereinafter. When the user pushes the trigger switch in the second stroke, such as in full stroke, the instruction to perform the reading operation is sent to the control circuit CC so that the control circuit CC and the optical mechanism OM perform reading operations described hereinafter.

Figure 6A:
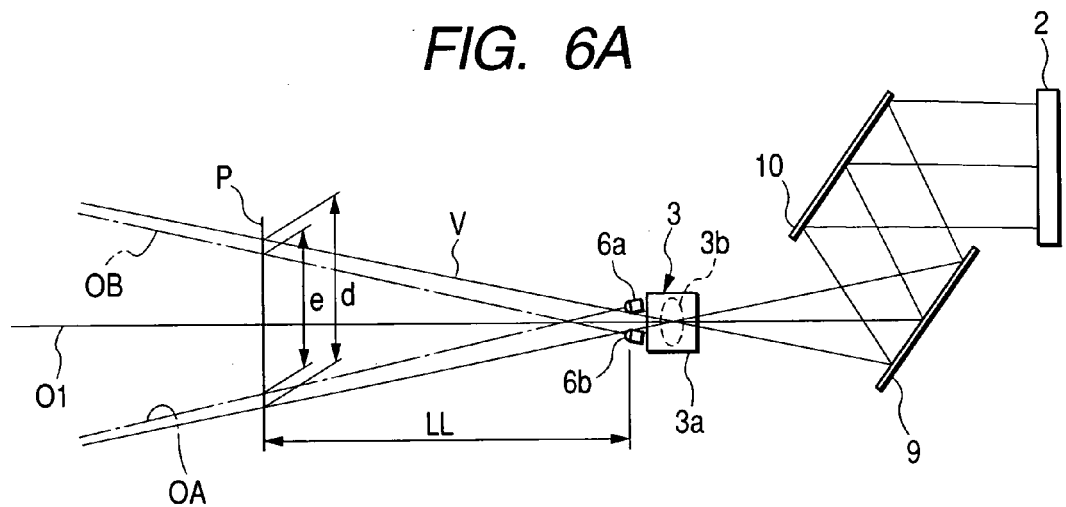
FIG. 6A is a view schematically illustrating a unit configured to measure a distance between its unit and a label as a target according to the first embodiment.

The optical mechanism OM includes a photodetector 2, an imaging lens 3, a focal point adjusting mechanism 4 disposed between the photodetector 2 and the imaging lens 3, a pair of lighting devices 5, and a pair of pointer light emitting devices 6a and 6b, such as laser diodes (see FIG. 6A).

As schematically illustrated in FIGS. 1, 2, 3A-3C, and 6A, the imaging lens 3 is provided with a body tube 3a and a plurality of lens elements 3b that is preferably disposed coaxially therein. The imaging lens 3 has a predetermined optical axis O1. The imaging lens 3 is arranged in the center portion of the body case 1 so that its optical axis O1 extends orthogonally with the one lateral end surface, which is formed with the reading window 1a, of the body case 1. The photodetector 2 is composed of, for example, a CCD area sensor. The photodetector 2 is located at the other lateral end side (backside in the first embodiment) of the body case 1 with respect to the imaging lens 3 to be close to one of the longitudinal side surfaces. The photodetector 2 has an active area (light sensitive area) and a predetermined optical axis. The photodetector 2 is arranged so that its active area is opposite to the one lateral end side (reading window side) of the body case 1 and the optical axis O2 is, for example parallel to the optical axis O1 at a predetermined interval Y (see FIG. 4A) thereto.

The focal point adjusting mechanism 4 further includes a displacement mechanism 14, which is schematically illustrated in FIG. 1.

Each of the lighting devices 5 is disposed around the imaging lens 3. That is, each of the lighting devices 5 is provided with light emitting devices 7 each of which is served as a light source. Each of the lighting devices 5 is also provided with a light lens 8 disposed between each light emitting device 7 and the reading window 1a. An optical axis of each light lens 8 is directed to the reading window 1a so that each light lens 8 is operative to collect and diffuse light emitted from each light emitting device 7 through the reading window 1a.

When the reading window 1a of the body case 1 is positioned so that the reading window 1a is opposite to the target, such as the label P, on which the two-dimensional code Q is written, the light emitted from each of the lighting devices 5 is irradiated through the reading window 1a to the two-dimensional code Q. Light reflected from the two-dimensional code Q is entered through the reading window 1a into the imaging lens 3. The reflected light entered into the imaging lens 3 is focused on the active area of the photodetector 2 by the imaging lens 3, so that an image corresponding to the target is picked up by the photodetector 2. The image picked up by the photodetector 2 is sent to the control circuit CC so that the two-dimensional code Q of the label P is decoded by the control circuit CC based on the image.

Next, the structure of the focal point adjusting mechanism 4 will be explained in detail hereinafter in accordance with FIGS. 1, 2, and 3A-3C.

The focal point adjusting mechanism 4, as shown in FIGS. 2 and 3A-3C, is provided with first and second reflectors 9 and 10, preferably serving as a fold mechanism according to the present invention. The first reflector 9 is disposed on the first optical axis O1 of the imaging lens 3 at the backside with respect to the imaging lens 3 (the right side with respect to the imaging lens in FIG. 2). The second reflector 10 is disposed on the second optical axis O2 of the photodetector 2 at the head side of the case 1 with respect to the photodetector 2 (the left side with respect to the photodetector 2 in FIG. 2) so that the photodetector 2 is opposite to the first reflector 9.

The first and second reflectors 9 and 10 are configured to fold an optical path R of the reflected light between the imaging lens 3 and the photodetector 2 two times like a letter Z or N to be directed toward the photodetector 2. Namely, the reflected light transmitted through the imaging lens 3 is folded by the first reflector 9 toward the second reflector 10 to be folded again by the second reflector 10 toward the photodetector 2 so that the reflected light is entered into the photodetector 2, which provides the Z-folded optical path R of the reflected light.

In particular, the first reflector 9 has, for example, a plate-like shape and a plane (surface) 9a of reflection. The first reflector 9 is so arranged that the reflection surface 9a is inclined with respect to the first optical axis O1 of the imaging lens 3 to be directed toward the second reflector 10. This arrangement allows the reflected light through the imaging lens 3 to be obliquely folded toward the second reflector 10.

The second reflector 10 also has, for example, a plate-like shape and a surface 10a of reflection. The second reflector 10 is so arranged that the reflection surface 10a is inclined with respect to the second optical axis O2 of the photodetector 2 to be opposite to the reflection surface 9a of the first reflector 9. This arrangement allows the reflected light by the reflection surface 9a of the first reflector 9 to be folded toward the photodetector 2 along the second optical axis O2.

As shown in FIGS. 4A to 4D, the focal point adjusting mechanism 4 is provided with a first shaft 11 fixedly attached to one side surface 9b orthogonal to the reflection surface 9a of the first reflector 9. The first shaft 11 is rotatably supported to the displacement mechanism 14 mounted on the body case 1 around its center axis (rotating axis) AX1. For example, assuming that the one side surface 9b of the first reflector 9 is opposite to an inner surface of one of the longitudinal sidewalls of the case 1, the displacement mechanism 14 is mounted on an inner surface of one of the longitudinal sidewalls of the case 1. Rotation of the first shaft 11 together with the first reflector 9 around the center axis AX1 allows an angle θ1 indicative of the sum of an incident angle of the reflected light to the first reflector 9 and a reflection angle thereof from the first reflector 9 to be changed. This angle θ1 is referred to as "first reflector angle" hereinafter.

The focal point adjusting mechanism 4 is provided with a second shaft 12 fixedly attached to one side surface 10b orthogonal to the reflection surface 10a of the second reflector 10. The focal point adjusting mechanism 4 is provided with a slidably supporting groove 13 formed on the body case 1. For example, in the first embodiment, it is assumed that the one side surface 10b of the second reflector 10 is opposite to an inner surface of one of the longitudinal sidewalls of the case 1. In this assumption, the slidably supporting groove 13 is formed on the inner surface of one of the longitudinal sidewalls of the case 1 to extend along the second optical axis O2 (see arrows A and B in FIG. 4A). The second shaft 12 is slidably supported in the slidably supporting groove 13 along the second optical axis O2 to be rotatable around its center axis (rotating axis) AX2.

Rotation of the second shaft 12 together with the second reflector 10 around the center axis AX2 allows a reflection angle θ2 indicative of the sum of an incident angle of the reflected light to the second reflector 10 and a reflection angle thereof from the second reflector 10 to be changed. This angle θ2 is referred to as "second reflector angle" hereinafter.

The displacement mechanism 14 serving as adjusting unit preferably has a first rotation mechanism 15a, a second rotation mechanism 15b, and a slide mechanism 15c.

The slide mechanism 15c is mechanically linked to the second shaft 12. The slide mechanism 15c causes the second shaft 12 to slide along the slidably supporting groove 13, that is, along the arrows A and B in FIG. 4A. The second rotation mechanism 15b is mechanically linked to the second shaft 12 The second rotation mechanism 15b causes the second shaft 12 to rotate together with the second reflector 10 around the center axis AX2 to correspond to predetermined sliding positions of the second reflector 10. This rotation of the second shaft 12 allows the second reflector angle θ2 to be adjusted.

The first rotation mechanism 15a causes the first shaft 11 to rotate together with the first reflector 9 around the center axis AX1 to adjust the first reflector angle θ1 based on the second reflector angle θ2 of the second reflector 10. This adjustment of the first reflector angle θ1 of the first shaft 11 allows the reflection surface 9a of the first reflector 9 to kept parallel to the reflection surface 10a of the second reflector 10. That is, the first reflector angle θ1 and the second reflector angle θ2 are kept equal to each other.

In the first embodiment, it is assumed that a line LI1 is defined to be orthogonal to the center axis AX1 of the first reflector 9 and the first optical axis O1, and that a line LI2 is defined to be orthogonal to the center axis AX2 of the first reflector 10 and the first optical axis O1.

In this assumption, the displacement of the second reflector 10 along the second optical axis O2 (arrows A and B) causes an interval X between the lines LI1 and LI2 (see FIG.

4A) to vary, thereby changing an optical path length between the imaging lens 3 and photodetector 2.

For example, displacement of the second reflector 10 along the second optical axis O2 by ΔX provides that change of the optical length between the imaging lens 3 and photodetector 2 is two times the ΔX. The adjustments of the first and second reflector angles of θ1 and θ2 with the displacement of the second reflector 10 along the second optical axis O2 permit the first and second optical axes O1 and O2 to be kept constant independently of the displacement of the second reflector 10 along the second optical axis O2. An interval Y between the first and second axes O1 and O2 is designed to be kept constant regardless of the displacements of the second reflector 10 and the rotations of the first and second reflectors 9 and 10.

In the first embodiment, as shown in FIGS. 2, 3A-3C and 4A-4D, the slide mechanism 15c operates to displace the second reflector 10 so as to temporarily fix it at selectively any one of predetermined first to third stop positions Pa to Pc. The second rotation mechanism 15b operates to rotate the second reflector 10 with the displacement of the second reflector 10 so as to temporarily fix the second reflector 10 at one of predetermined second reflector angles θ2a to θ2c, which corresponds to the selected one of the predetermined first to third stop positions Pa to Pc. Similarly, the first rotation mechanism 15a operates to rotate the first reflector 9 with the rotation of the second reflector 10 so as to temporarily fix the first reflector 9 at one of predetermined first reflector angles θ1a to θ1c, which corresponds to the selected one of the predetermined second reflector angles θ2a to θ2c of the second reflector 10.

The variation of the stop position of the second reflector 10, in other words, the change of each of the first and second reflectors 9 and 10 allows an optical path length between the imaging lens 3 and the photodetector 2 to be adjusted. This adjustment of the optical path length permits the focal length of the imaging lens 3 to be controlled, and furthermore, a reading distance of the two-dimensional code reader CR to be controlled. The reading distance of the two-dimensional code reader CR is defined as a distance between the reading window 1a and the target, such as the label P.

Figure 3A:
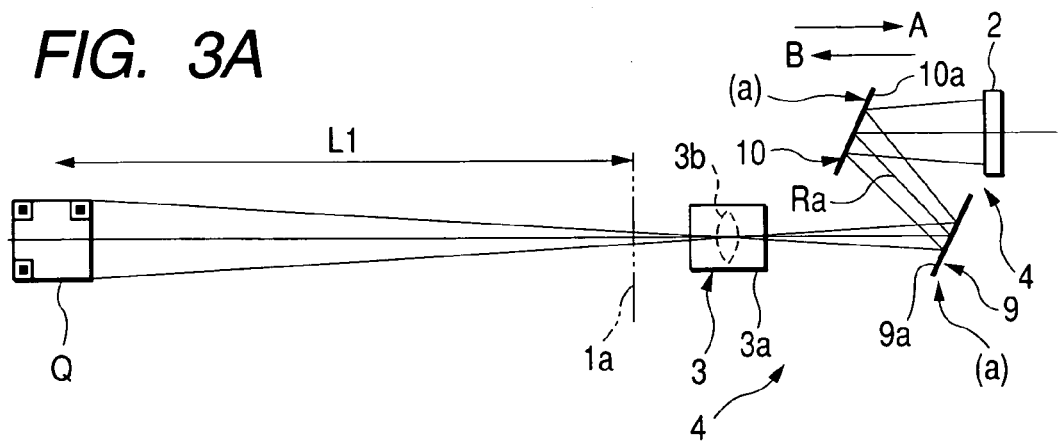
FIG. 3A is a view schematically illustrating a first state of each of first and second reflectors shown in FIGS. 1 and 2, which is viewed along a lateral direction of a body case shown in FIG. 1 according to the first embodiment.
Figure 4A:
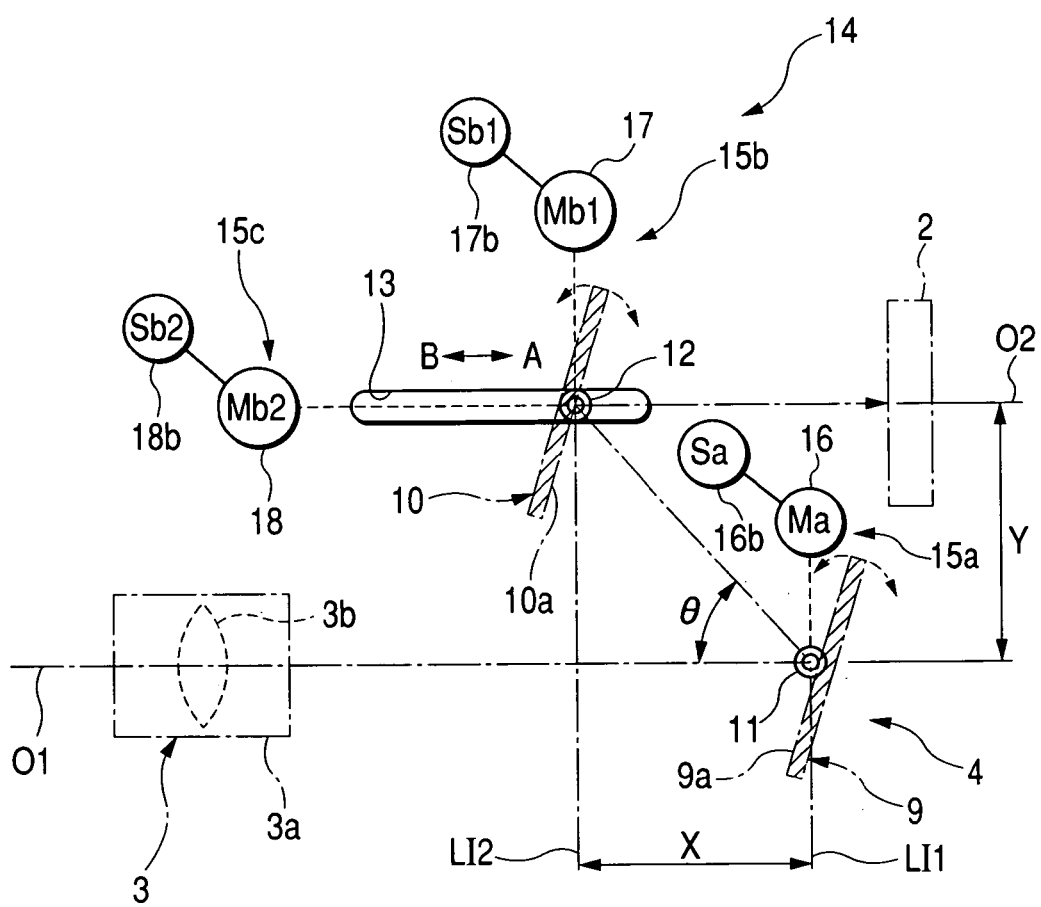
FIG. 4A is a view schematically illustrating a structure of a displacement mechanism shown in FIG. 1 according to the first embodiment.
Figure 4B:
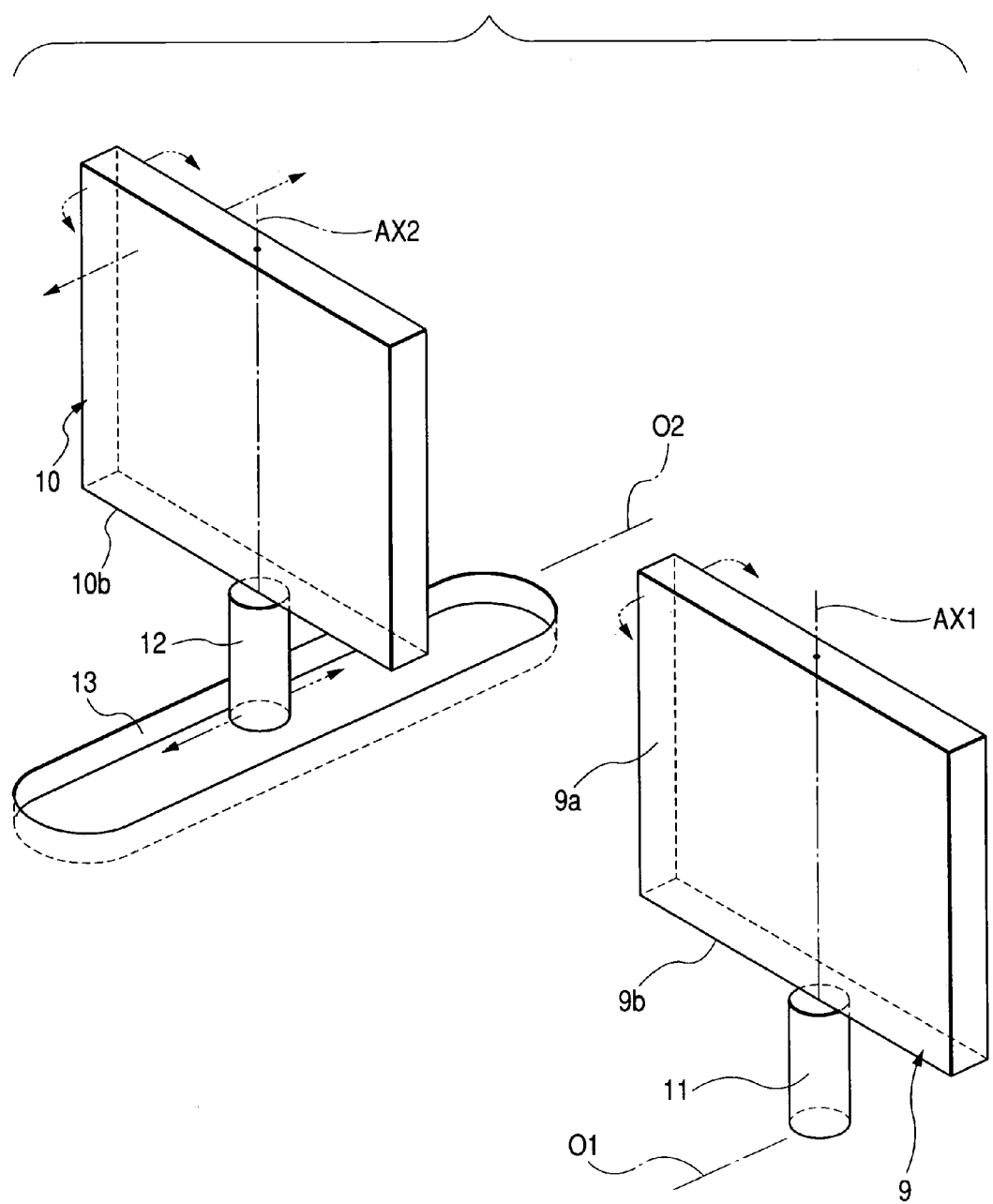
FIG. 4B is a perspective view schematically illustrating a supporting structure of the first and second reflectors shown in FIGS. 3A to 3C according to the first embodiment.
Figure 4C:
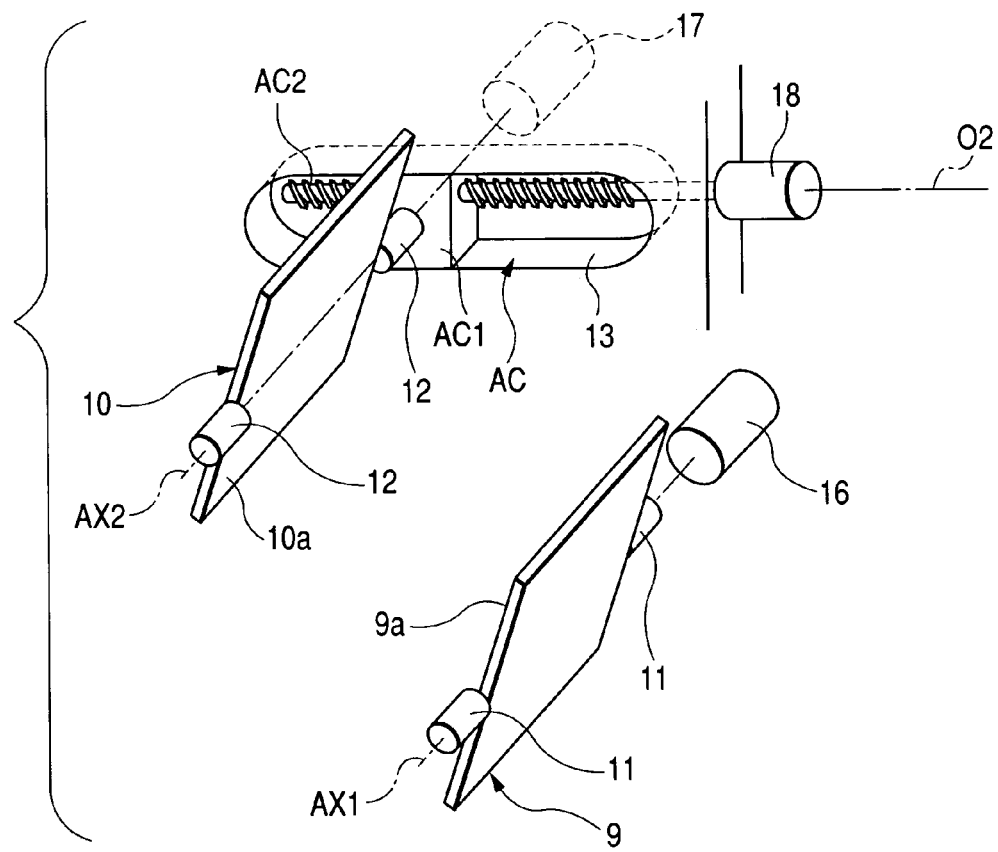
FIG. 4C is a perspective view illustrating the structure of the displacement mechanism shown in FIGS. 4A and 4B in detail according to the first embodiment.

FIG. 3A shows a first state (a) that the second reflector 10 is fixed at the first stop position Pa and its second reflector angle is set to the angle of θ2a so that the first reflector angle of the first reflector 9 is set to the angle of θ1a.

In this first state (a), the interval X between the lines LI1 and LI2 is set to be comparatively short and each of the first and second reflector angles θ1a and θ2a is set to be comparatively large. This arrangement causes the length of an optical path Ra between the imaging lens 3 and the photodetector 2 to be comparatively short, which permits the reading distance L1 to meet the comparatively short optical path Ra to be large, for example, 300 mm plus or minus 70 mm. In other words, in the first state (a), the focal point of the imaging lens 3 is set to be comparatively far therefrom.

Figure 3B:
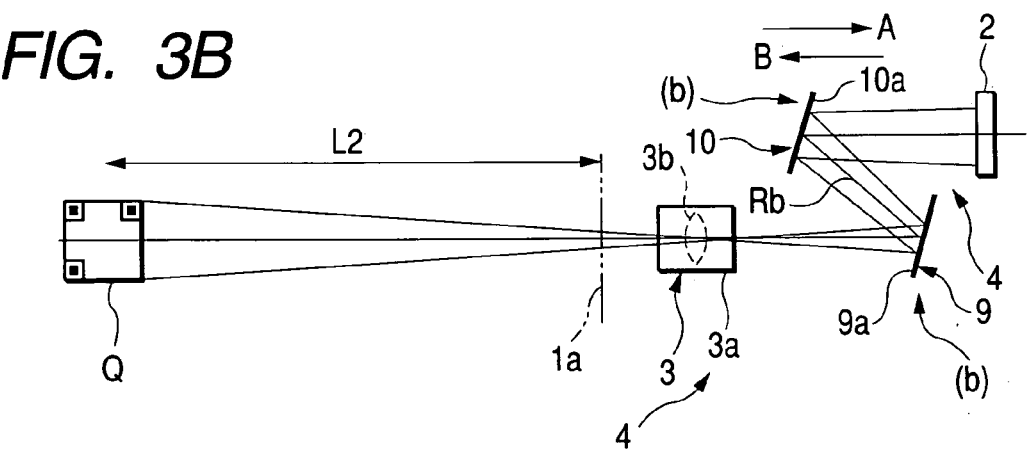
FIG. 3B is a view schematically illustrating a second state of each of the first and second reflectors shown in FIGS. 1 and 2, which is viewed along the lateral direction of the body case shown in FIG. 1 according to the first embodiment.
Figure 3C:
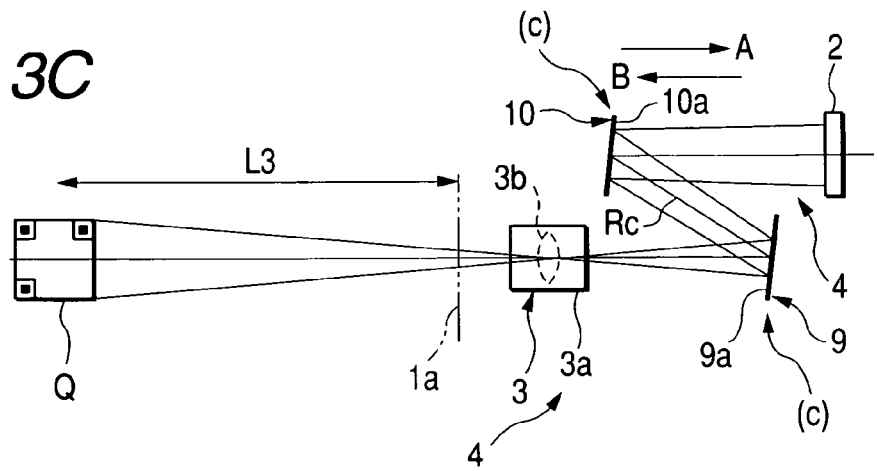
FIG. 3C is a view schematically illustrating a third state of each of the first and second reflectors shown in FIGS. 1 and 2, which is viewed along the lateral direction of the body case shown in FIG. 1 according to the first embodiment.

FIG. 3C shows a third state (c) that the second reflector 10 is fixed at the third stop position Pc and its second reflector angle is set to the angle of θ2c so that the first reflector angle of the first reflector 9 is set to the angle of θ1c.

In this third state (c), the interval X between the lines LI1 and LI2 (FIG. 4A) is set to be comparatively long and each of the first and second reflector angles θ1c and θ2c is set to be comparatively small, as compared with the first state (a). This arrangement causes the length of an optical path Rc between the imaging lens 3 and the photodetector 2 to be comparatively long, as compared with the length of the optical path Ra. This feature permits the reading distance L3 to meet the comparatively long optical path Rc to be short, for example, 120 mm plus or minus 30 mm. In other words, in the third state (c), the focal point of the imaging lens 3 is set to be comparatively close thereto, as compares with the first state (a).

FIG. 3B shows a second state (b) that the second reflector 10 is fixed at the second stop position Pb and its second reflector angle is set to the angle of θ2b so that the first reflector angle of the first reflector 9 is set to the angle of θ1b.

In this second state (b), the interval X between the lines LI1 and LI2 (FIG. 4A) is set to be an intermediate length between the intervals in the first and third states (a) and (c) and each of the first and second reflector angles θ1b and θ2b is set to be intermediate angle between each of the first and second reflector angles θ1a and θ2a and each of the first and second reflector angles θ1c and θ2c. This arrangement causes the length of an optical path Rb between the imaging lens 3 and the photodetector 2 to be comparatively short, which permits the reading distance L2 to meet the comparatively short optical path Ra to be large, for example, 200 mm plus or minus 50 mm. In other words, in the first state (a), the focal point of the imaging lens 3 is set to be comparatively far therefrom.

In addition, the first rotation mechanism 15a has a first servo motor (Ma) 16 with a rotation axis coupled to the first shaft 11 of the first reflector 9. The first serve motor 16 is electrically connected to the control circuit CC. The first servomotor 16 operates to rotate at any angles the rotation axis together with the first shaft 11 and the first reflector 9 under the control of the control circuit CC. The first rotation mechanism 15a also has an absolute position sensor (absolute encoder) 16b for sensing an absolute position of the rotation axis of the first serve motor 16.

Similarly, the second rotation mechanism 15b has a second servomotor (Mb1) 17 with a rotation axis coupled to the second shaft 12 of the second reflector 10. The second servomotor 17 is electrically connected to the control circuit CC. The second servomotor 17 operates to rotate at any angles the rotation axis together with the second shaft 12 and the second reflector 10 under the control of the control circuit CC. The second rotation mechanism 15b also has an absolute position sensor 17b for sensing an absolute position of the rotation axis of the second serve motor 17.

The slide mechanism 15c has an actuator AC mechanically linked to the second shaft 12, and a third servomotor (Mb2) 18 with a rotation axis coupled to the actuator AC.

The third servomotor 18 is electrically connected to the control circuit CC. The third servomotor 18 operates to supply rotation energy to the actuator AC so that the actuator AC causes the second shaft 12 to slide along the second optical axis O2 illustrated by the arrows A and B in FIG. 4A among the first to third stop positions Pa to Pc.

For example, the actuator AC has a slidable supporting member AC1 rotatably supporting the second shaft 12, and a ball thread AC2 coupled to the rotation axis of the third servomotor 18 so that the drive of the third servomotor 18 makes the ball thread AC2 rotate, thereby sliding the supporting member AC1 together with the shaft 12 along the second optical axis O2. Another example, the actuator AC has a pulley and a belt conveyer mechanism rotatably supporting the pulley and conveyer mechanism electrically connected to the third servomotor 18. The pulley rotatably supports the second shaft 12. That is, the drive of the third servomotor 18 makes the belt conveyer mechanism drive, thereby sliding the pulley together with the shaft 12 along the second optical axis O2.

The first to third servomotors 16 to 18 are driven in synchronization with one another by the control circuit CC.

FIG. 5 is a functional block diagram of the control circuit CC according to the first embodiment of the present invention.

The control circuit CC has a pointer control block B1 operative to control the pointer light emitting devices 6*a* and 6*b*, a pointer detection block B2 operative to positions of pointer lights irradiated from the pointer light emitting devices 6*a* and 6*b*, a distance determining block B3, and a decoding block B4.

The control circuit CC has a drive variable instruction block 19, a drive variable allocation block 20, a servomotor drive control block 16*a*, a servomotor drive control block 17*a*, and a servomotor drive control block 18*a*. The functional blocks of the control circuit CC are communicably coupled to one another.

Figure 6B:
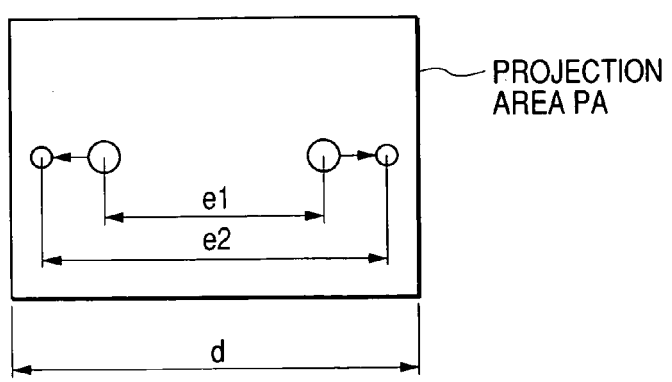
FIG. 6B is a view schematically illustrating a projection area of a reading field of view projected on the label according to the first embodiment.

As shown in FIGS. 6A and 6B, the pair of pointer light emitting devices 6*a* and 6*b* serves as a unit for measuring a distance between each of the pointer light emitting devices 6*a*, 6*b* and the label P as the target. The pointer light emitting devices 6*a* and 6*b* are electrically coupled to the control circuit CC.

As shown in FIG. 6*a*, the pointer light emitting devices 6*a*, 6*b* are disposed around the imaging lens 3 along a lateral direction of the case 1 so that the pointer light emitting devices 6*a*, 6*b* are symmetrical through the imaging lens 3 along the lateral direction.

It is assumed that the reading window 1*a* of the body case 1 is positioned so that the reading window 1*a* is opposite to the target, such as the label P. In this one of service conditions of the code reader RC, an optical axis OA of the pointer light emitting device 6*a* is directed to cross with the first optical axis O1. In this one of the service conditions of the code reader CR, an optical axis OB of the pointer light emitting devices 6*b* is directed to cross with the first optical axis O1 and the optical axis OA of the pointer light emitting devices 6*a*.

Each of pointer lights, such as red spotlights, emitted along each of the optical axes OA and OB from each of the pointer light emitting devices 6*a* and 6*b* is limited within a reading field of view V defined by the imaging lens 3 and the photodetector 2. The reading field of view V represents the area readable by the imaging lens 3 and the photodetector 2.

The pointer lights emitted along the optical axes OA and OB from the pointer light emitting devices 6*a* and 6*b* are irradiated through the reading window 1*a* to both sides of the label P along the lateral direction, respectively.

The pointer lights emitted along the optical axes OA and OB from the pointer light emitting devices 6*a* and 6*b* are positioned within the profile of the reading field of view V. This results in that the variation of a distance LL between each beam emitting point of each pointer light emitting device 6*a*, 6*b* and the target (label P) causes the irradiated positions of the pointer lights on a projection area PA of the reading field of view V projected on the target (label P) to vary.

That is, as shown in FIG. 6B, when the target (label P) is positioned to be relatively close to the reading window 1*a*, the distance e between the irradiated positions of the pointer lights on the projection area PA is represented as "e1".

In contrast, when the target (label P) is positioned to be far from the reading window 1*a*, the distance e between the irradiated positions of the pointer lights on the projection area PA is represented as "e2", which is wider than the distance e1.

Therefore, the farther the target (label P) is from the reading window 1*a*, the closer the irradiated positions of the pointer lights on the projection area PA are to both sides of the projection area PA along the lateral direction. In other words, the farther the target (label P) is from the reading window 1*a*, the farther the distance between the irradiated positions of the pointer lights on the projection area PA are from each other.

This makes it clear that the distance e between the irradiated positions of the pointer lights on the projection area PA represents information related to the positional relationship between the label P and the reading window 1*a*.

The control circuit CC, when the user pushes the trigger switch TS in the first stroke so that the instruction to perform the measurement operation is sent to the control circuit CC, the pointer control block B1 of the control circuit CC controls to turn on the pointer light emitting devices 6*a* and 6*b*, respectively.

The turning on of the pointer light emitting devices 6*a* and 6*b* cause the pointer lights to be emitted therefrom. As a result, lights reflected from the target (label P) based on the emitted pointer lights are entered through the reading window 1*a* into the imaging lens 3. The reflected lights entered into the imaging lens 3 are focused on the active area of the photodetector 2 by the imaging lens 3, so that an image based on the pointer lights is picked up by the photodetector 2. The image picked up by the photodetector 2 is sent to the control circuit CC.

The pointer detection block B2 of the control circuit CC detects the positions of the pointer lights irradiated on the projection area PA projected on the target (label P), thereby obtaining the distance e between the irradiated positions of the pointer lights on the projection area PA.

The distance detecting block B3 of the control circuit CC calculates a ratio (e/d) of the obtained distance e to a length "d" between both sides of the projection area PA along the lateral direction. Next, the distance detecting block B3 of the control circuit CC compares the calculated ratio (e/d) with a predetermined value stored in a table T incorporated in the control circuit CC (see FIG. 5), thereby determining which level the distance LL has in a plurality of levels, such as "long", "medium", or "short".

For example, when the distance LL is determined to "long", the distance LL is referred to as "long distance LLa" representing that the label P is relatively far from the reading window 1*a*. When the distance LL is determined to "short" so that the distance LL is referred to as "short distance LLc" representing that the label P is relatively close to the reading window 1*a*.

When the distance LL is determined to "medium", the distance LL is represented as "medium distance LLb". The long distance LLa is the longest of the distances LLa to LLc, and the medium distance LLb is a medium between the long distance LLa and the short distance LLc. The short distance LLc is the shortest of the distances LLa to LLc.

Subsequently, the drive variable instruction block 19 of the control circuit CC determines a target value of the focal point (reading distance) based on the determined result of the distance LL, thereby instructing the target value to the drive variable allocation block 20 of the control circuit CC. The drive variable allocation block 20 determines drive variables of the first to third servomotors 16 to 18 based on the target value, respectively, thereby instructing the determined drive variables to the servomotor drive control blocks 16*a* to 18*a*, respectively.

That is, when the determined result represents that the distance LL is "long distance LLa", the servomotor drive control block 18a executes a feedback control of the servomotor 18. The feedback control causes the second reflector 10 to slide up to the first stop position Pa, thereby stopping it based on the absolute position of the rotation axis of the first serve motor 16.

In synchronization with the control of the control block 18a, the servomotor drive control block 17a executes a feedback control of the servomotor 17 to rotate the second reflector 10 so that the second reflector angle θ2 becomes to the angle of θ2a. In synchronization with the control of the control block 17a, the servomotor drive control block 16a executes a feedback control of the servomotor 16 to rotate the first reflector 9 so that the first reflector angle θ1 becomes to the angle of θ1a.

In particular, the servomotor drive control blocks 16a and 17a control the first and second servomotors 16 and 17 to set the first and second reflector angles θ1 and θ2 according to the fixed position Pa of the second reflector 10 along the second optical axis O2, that is, the interval X between the second reflector 10 fixed at the first stop position Pa and the first reflector 9 along the first optical axis O1, respectively.

For example, it is assumed that the interval X between the second reflector 10 fixed at the first stop position Pa and the first reflector 9 along the first optical axis O1 is represented as "Xa". In this assumption, each of the first and second reflector angles θ1a and θ2a is represented as an equation of "θ1a (=θ2a)=arctan(Y/Xa)". This allows the servomotor drive control blocks 16a and 17a to easily control the first and second servomotors 16 and 17 so that the first and second reflector angles θ1 and θ2 become to the angle of θ1a and θ2a, respectively.

As a result, the first and second reflectors 9 and 10 turn to the first state (a) shown in FIG. 3A.

Simultaneously, when the determined result represents that the distance LL is "middle distance LLb", the servomotor drive control block 18a executes a feedback control of the third servomotor 18 to slide the second reflector 10 up to the second stop position Pb so as to temporarily fix it based on the absolute position of the rotation axis of the third servomotor 18. In synchronization with the control of the control block 18a, the servomotor drive control block 17a executes a feedback control of the second servomotor 17 to rotate the second reflector 10 so that the second reflector angle θ2 turns to the angle of θ2b based on the absolute position of the rotation axis of the second servomotor 17.

In synchronization with the control of the control block 17a, the servomotor drive control block 16a executes a feedback control of the first servomotor 16 to rotate the first reflector 9 so that the first reflector angle θ1 turns to the angle of θ1b based on the absolute position of the rotation axis of the first servomotor 16.

As a result, the first and second reflectors 9 and 10 turn to the second state (b) shown in FIG. 3B.

When the determined result represents that the distance LL is "short distance LLc", the servomotor drive control block 18a controls the servomotor 18 to slide the second reflector 10 up to the third stop position Pc, thereby temporarily fixing it. In synchronization with the control of the control block 18a, the servomotor drive control block 17a controls the servomotor 17 to rotate the second reflector 10 so that the second reflector angle θ2 turns to the angle of θ2c. In synchronization with the control of the control block 17a, the servomotor drive control block 16a controls the servomotor 16 to rotate the first reflector 9 so that the first reflector angle θ1 turns to the angle of θ1c. As a result, the first and second reflectors 9 and 10 turn to the second state (c) shown in FIG. 3C.

Next, overall operations of the two-dimensional code reader CR will be described hereinafter.

In a case of using the two-dimensional code reader CR to read the two-dimensional code C written on the label P, the user locates the two-dimensional code reader CR at a position in front of the label P so that the reading window 1a of the body case 1 is opposite to the label P at an arbitrary distance therebetween.

Next, the user pushes the trigger switch TS in the first stroke. The first stroke of the trigger switch TS causes the measurement operation of the code reader CR to be performed.

That is, the functional blocks B1 to B3, 19, 20, and 16a to 18a of the control circuit CC execute the processes set forth above. This results in that the distance LL between each pointer light emitting device 6a, 6b and the label P and therefore the positional relationship between the reading window 1a and the label P are determined, respectively, so that the first and second reflectors 9 and 10 turn to any one of the first to third states (a) to (c).

Next, the user pushes the trigger switch TS in the second stroke so that the reading operation of the two-dimensional code C is performed.

That is, the light emitted from each of the lighting devices 5 is irradiated through the reading window 1a to the two-dimensional code C written on the label P. Light reflected from the two-dimensional code C is entered through the reading window 1a into the imaging lens 3.

The light entered into the imaging lens 3 is focused on the active area of the photodetector 2 by the imaging lens 3, so that an image corresponding to the two-dimensional code C is picked up by the photodetector 2. The image picked up by the photodetector 2 is sent to the decoding block B4 of the control circuit CC so that the two-dimensional code C of the label P is decoded by the decoding block B4 of the control circuit CC based on the image.

In particular, in the embodiment of the present invention, as shown in FIGS. 2 and 3A to 3C, the reflected light transmitted through the imaging lens 3 is folded by the first reflector 9 of the focal point adjusting mechanism 4 at the first reflector angle θ1 toward the second reflector 10. The reflected light is folded again by the second reflector 10 of the focal point adjusting mechanism 4 at the second reflector angle θ2 toward the photodetector 2 so as to be entered into the photodetector 2.

The displacement of the second reflector 10 along the second optical axis 2 and the rotations of the first and second reflectors 9 and 10 among the different first to third states (a) to (c) allow the optical path length between the imaging lens 3 and the photodetector 2 to be adjusted.

The adjustment of the optical path length between the imaging lens 3 and the photodetector 2 permits the focal length of the imaging lens 3 to be controlled while keeping each of the first and second optical axes O1 and O2 of the imaging lens 3 and the photodetector 2 constant. This is because the first and second reflector angles θ1 and θ2 are adjusted in correspondence with the first to third stop positions of the second reflector 10 so as to keep the first and second optical axes O1 and O2 of the imaging lens 3 constant.

For example, as shown in FIGS. 2A, 3A and 6A, when the distance LL between each pointer light emitting device 6a, 6b and the label P is relatively "long", that is, the long distance LLa, each of the first and second reflectors 9 and 10 turn to the first state (a). This first state (a) of each of the first and second reflectors 9 and 10, as shown in FIG. 3A, allows the interval X to comparatively decrease, thereby decreasing the length of the optical path R between the imaging lens 3 and the photodetector 2 (see "Ra" in FIG. 3A). This results in increasing the reading distance L between the reading window 1a and the label P (see "L1" in FIG. 3A), which meets the condition that the label P is relatively "long" from the code reader CR.

In contrast, when the distance LL between each pointer light emitting device 6a, 6b and the label P is relatively "short", that is, the short distance LLc, each of the first and second reflectors 9 and 10 turn to the third state (c). This third state (c) of each of the first and second reflectors 9 and 10, as shown in FIG. 3C, allows the interval X to comparatively decrease, thereby increasing the length of the optical path R between the imaging lens 3 and the photodetector 2 (see "Rc" in FIG. 3C). This results in increasing the reading distance L between the reading window 1a and the label P (see L3 in FIG. 3C), which meets the condition that the label P is relatively "short" from the code reader CR.

In addition, when the distance LL between each pointer light emitting device 6a, 6b and the label P is relatively "medium", that is, the short distance LLb, each of the first and second reflectors 9 and 10 turn to the second state (b). This second state (b) of each of the first and second reflectors 9 and 10, as shown in FIG. 3B, allows the interval X to be comparatively kept medium between the interval of the first state (a) and that of the third state (c). This causes the length of the optical path R between the imaging lens 3 and the photodetector 2 (see "Rb" in FIG. 3B) to be kept medium between the optical paths Ra and the Rb. The medium optical path length keeps the reading distance L between the reading window 1a and the label P (see L2 in FIG. 3B) medium between the reading distances L1 and L3, which meets the condition that the label P is relatively "medium" from the code reader CR.

Consequently, even if the label P is positioned at any one of the three levels (long distance LLa, the medium distance LLb, and the short distance LLc), the focal point adjusting mechanism 4 makes it possible to automatically determine one of the reading directions L1 to L3. The determined one of the reading directions L1 to L3 is suitable for any one of the long distance LLa, the medium distance LLb, and the short distance LLc.

This results in expanding the range of usable reading distance of the two-dimensional code reader CR.

In addition, in the first embodiment, the first and second reflectors 9 and 10 are arranged between the imaging lens 3 and the photodetector 2 and the displacement mechanism 14 changes the interval of the first and second reflectors 9 and 10 along the first optical axis O1 and the first and second reflector angles θ1 and θ2 with each of the first and second optical axes O1 and O2 kept constant.

Figure 4D:
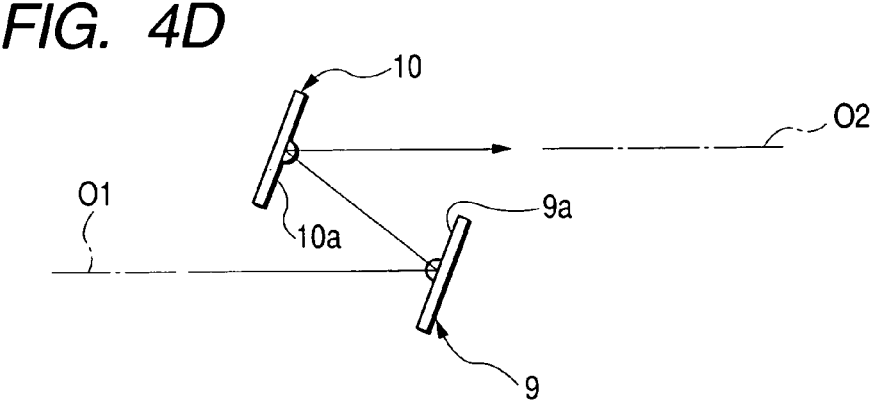
FIG. 4D is a view illustrating an arrangement of the first and second reflectors shown in FIGS. 3A to 3C according to the first embodiment.

This structure allows the reflected light transmitted through the imaging lens 3 to be folded plural times to be guided toward the photodetector 2 (see FIG. 4D). That is, the focal point adjusting mechanism 4 changes the optical path length between the imaging lens 3 and the photodetector 2 without displacing the imaging lens 3 along the first optical axis O1, which prevents the code reader CR from being upsized in its first optical direction O1. As a result, it is possible to downsize the code reader CR, as compared with a code reader having a mechanism configured to displace an imaging lens along its optical axis. This structure of the first embodiment also permits the optical path length between the imaging lens 3 and the photodetector 2 to be widely changed even if the displacement of the second reflector 10 along the second optical axis O2 is small.

As described above, the code reader CR according to the first embodiment provides advantages of expanding the range of its reading distance and having a comparatively simple and compact structure for adjusting the reading distance. Especially, in the first embodiment, the focal point adjusting mechanism 4 makes displacement of the second reflector 10 along the second optical axis O2 without making displacement of the first reflector 9 along the first optical axis O1.

This structure of the focal point adjusting mechanism 4 allows the interval between the first and second reflectors 9 and 10 along the first optical axis O1 to be adjusted with the structure of the focal point adjusting mechanism 4 itself being kept compact. In addition, the focal point adjusting mechanism 4 is provided with the first and second servomotors 16 and 17 that are driven in synchronization with each other, which allows the first and second reflector angles θ1 and θ2 of the first and second reflectors 9 and 10 to be securely adjusted, Furthermore, the first embodiment includes the unit for measuring a positional relationship between the label P and the reading window 1a. The first embodiment includes the focal point adjusting mechanism 4 for automatically changing each state of each of the first and second reflectors 9 and 10 among the first to third states (a) to (c) according to the measurement result under the control of the control circuit CC, making it possible to simplify an adjustment of the reading distance.

In the first embodiment, as the unit for measuring the positional relationship between the label P and the reading window 1a, the pair of pointer light emitting devices 6a, 6b each having a relatively simple structure are provided This makes it possible to keep the size of the two-dimensional code reader CR compact.

Figure 7A:
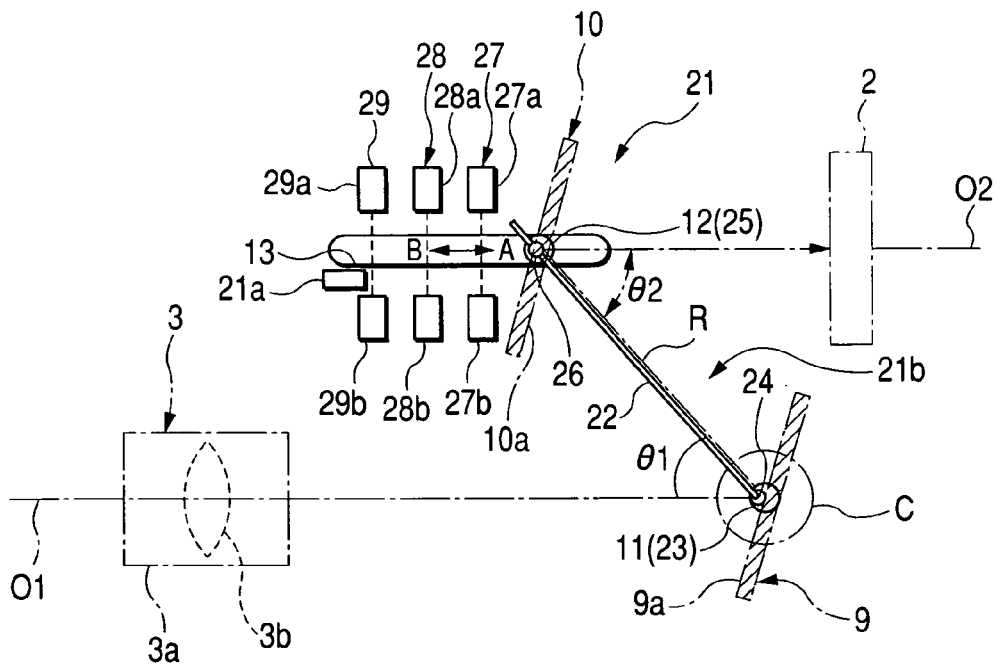
FIG. 7A is a view schematically illustrating a structure of a focal point adjusting mechanism according to a second embodiment of the present invention.
Figure 7B:
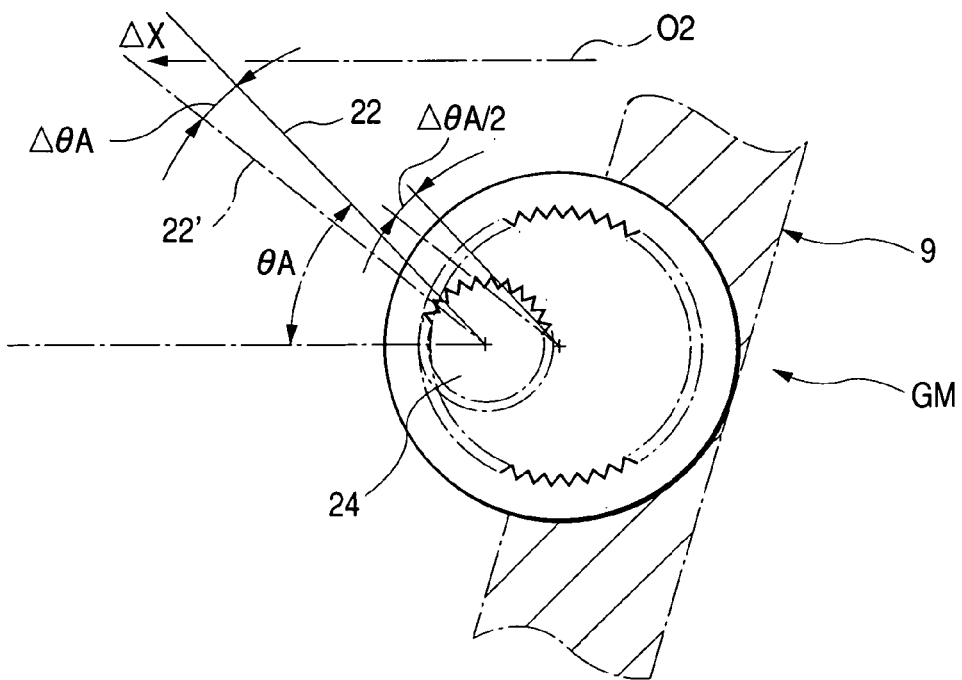
FIG. 7B is an enlarged view of a circle portion represented as reference character C shown in FIG. 7A.

FIGS. 7A and 7B illustrate a second embodiment of the present invention. In the second embodiment, the structure of a displacement mechanism 21 is different from that of the displacement mechanism 14 of the first embodiment. Explanations of other components, therefore, of the code reader according to the second embodiment are omitted or simplified. The displacement mechanism preferably serves as a cooperative mechanism according to the present invention.

In the second embodiment, the first reflector 9 and the first shaft 11 are rotatably supported to the case 1. The second shaft 12 and the second reflector 10 are slidably supported in the slidably supporting groove 13 together with each other to be rotatable therein.

The displacement mechanism 21 has a slide mechanism 21a, schematically illustrated in FIG. 7A, operative to slide the second shaft 12 along the slidably supporting groove 13, that is, along the arrows A and B in FIG. 7A. The displacement mechanism 21 has an angle adjusting mechanism 21b operative to adjust the first and second reflector angles θ1 and θ2 of the first and second reflectors 9 and 10 according to the displacement of the second reflector 10 along the second optical axis O2. In this second embodiment, the angle adjusting mechanism 21b is provided with a connecting shaft 22 connecting between the first and second shafts 11 and 12. The connecting shaft 22 is designed to change its angle with respect to the first optical axis O1 depending on the displacement of the second shaft 12. The angle of the connecting pole 22 with respect to the first optical axis O1 is referred to as "$\theta_4$". The angle adjusting mechanism 21b is also provided with a gear mechanism GM linked to the connecting pole 22 and configured to rotate the first and second reflectors 9 and 10 according to the change of the angle $\theta_A$ of the connecting pole 22 with respect to the first optical axis O1.

The gear mechanism GM is equipped with a first internal gear 23 coaxially coupled to the first shaft 11, and a first pinion 24 whose diameter is smaller than the diameter of the first internal gear 23. The first pinion 24 has an external gear portion that is meshed with an internal gear portion of the internal gear 23. One end portion of the connecting pole 22 is coupled to the first pinion 24 to be parallel to the radial direction of the first pinion 24.

The gear mechanism GM is also equipped with a second internal gear 25 coaxially coupled to the second shaft 12, and a second pinion 26 whose diameter is smaller than the diameter of the second internal gear 25. The second pinion 26 has an external gear portion that is meshed with an internal gear portion of the internal gear 25. One end portion of the connecting pole 22 is fixedly coupled to the first pinion 24 to be parallel to the radial direction of the first pinion 24. The other end portion of the connecting pole 22 is freely penetrated through the second pinion 26 to extend along the radial direction of the second pinion 26.

The slide mechanism 21a has a rack and pinion mechanism mechanically linked to the second shaft 12 and a motor coupled to the rack and pinion mechanism. The motor is electrically connected to the control circuit CC. The motor operates to supply rotation energy to the rack and pinion mechanism so that the rack and pinion mechanism causes the second supporting member FS2 (the second reflector 10) to slide along the second optical axis O2 illustrated by the arrows A and B in FIG. 5A among the first to third stop positions Pa to Pc.

The displacement mechanism 21 also has, for example, first to third through-beam sensors 27 to 29 mounted on both sides of the supporting groove 13 of the inner surface of one of the longitudinal sidewalls of the case 1, respectively.

The first through-beam sensor 27 is disposed corresponding to the first stop position Pa of the second reflector 10. The first through-beam sensor 27 has a pair of phototransmitter 27a and photodetector 27b. The photodetector 27a is disposed at one of the sides of the supporting groove 13 of the inner surface of one of the longitudinal sidewalls of the case 1, which corresponds to the first stop position Pa. The photodetector 27b is disposed at the other of the sides of the supporting groove 13 of one of the longitudinal sidewalls. An active area of the photodetector 27b is directed toward the phototransmitter 27a so that the optical axis of the phototransmitter 27a coincides with that of the photodetector 27b.

Similarly, the second through-beam sensor 28 is disposed corresponding to the second stop position Pb of the second reflector 10 the second through-beam sensor 28 has a pair of phototransmitter 28a and photodetector 28b. An active area of the photodetector 28b is directed toward the phototransmitter 28a so that the optical axis of the phototransmitter 28a coincides with that of the photodetector 28b. In addition, the third through-beam sensor 29 is disposed corresponding to the third stop position Pc of the second reflector 10. The third through-beam sensor 29 has a pair of phototransmitter 29a and photodetector 29b. An active area of the photodetector 29b is directed toward the phototransmitter 29a so that the optical axis of the phototransmitter 29a coincides with that of the photodetector 29b.

Each of the phototransmitters 27a to 29a is operative to constantly transmit a directional beam along each of the corresponding optical axes, and each of the photodetectors 27b to 29b is operative to constantly receive the transmitted directional beam from each of the phototransmitters 27a to 29a.

That is, the first to third photodetectors 27b to 29b are operative to detect that the second shaft 12 intercepts the directional beams transmitted from the first to third phototransmitters 27a to 29a to transmit detection signals to the control circuit CC, respectively.

When the second reflector 10 (the second shaft 12) is slid by $\Delta X$ in the supporting groove 13 by the slide mechanism 21a, the connecting pole 22 is pivoted by $\Delta\theta_A$ along the displacement direction of the second reflector 10. The pivot of the connecting pole 22 causes the first and second pinions 24 and 26 to rotate so that the first and second inner ears 23 and 25 meshed to the first and second pinions 24 and 26 are rotated, respectively. For example, as shown in FIG. 7B, when the connecting pole 22 is pivoted by $\Delta\theta_A$, the first and second inner gears 23 and 25, that is, the first and second reflectors 9 and 10 are rotated by $(\Delta\theta_A)/2$.

Similarly to the first embodiment, in the second embodiment, when the second reflector 10 is fixed at each of the first to third stop positions Pa to Pc, the first reflector angle $\theta 1$ is set to each of the angles $\theta 1a$ to $\theta 1c$ and the second reflector angle $\theta 2$ is set to each of the angles $\theta 2a$ to $\theta 2c$.

The control circuit CC, as well as the first embodiment, controls the motor of the slide mechanism 21a to drive the rack and pinion mechanism, thereby displacing the second reflector 10 to temporarily fix it at any one of the first to third stop positions Pa to Pc based on the detection signals transmitted from the photodetectors 27b to 29b.

The displacement of the second reflector 10 to be temporarily fixed at any one of the first to third stop positions Pa to Pc allows the first reflector angle to be set corresponding to any one of $\theta 1a$ to $\theta 1c$ (the first to third states (a) to (c)), and the second reflector angle to be set corresponding to any one of $\theta 2a$ to $\theta 2c$ (the first to third states (a) to (c)).

As a result, the displacement mechanism 21 makes it possible to adjust the optical path length between the imaging lens 3 and the photodetector 2 with each of the first and second optical axes kept constant.

As described above, the code reader according to the second embodiment provides advantages of expanding the range of its reading distance and having a comparatively simple and compact structure for adjusting the reading distance. Especially, in the second embodiment, displacement of the second reflector 10 along the second optical axis O2 by the displacement mechanism 21 allows the first and second reflectors 9 and 10 to rotate without using motors for rotating the first and second reflectors 9 and 10. This results in further simplifying the structure of the displacement mechanism 21.

Figure 8:
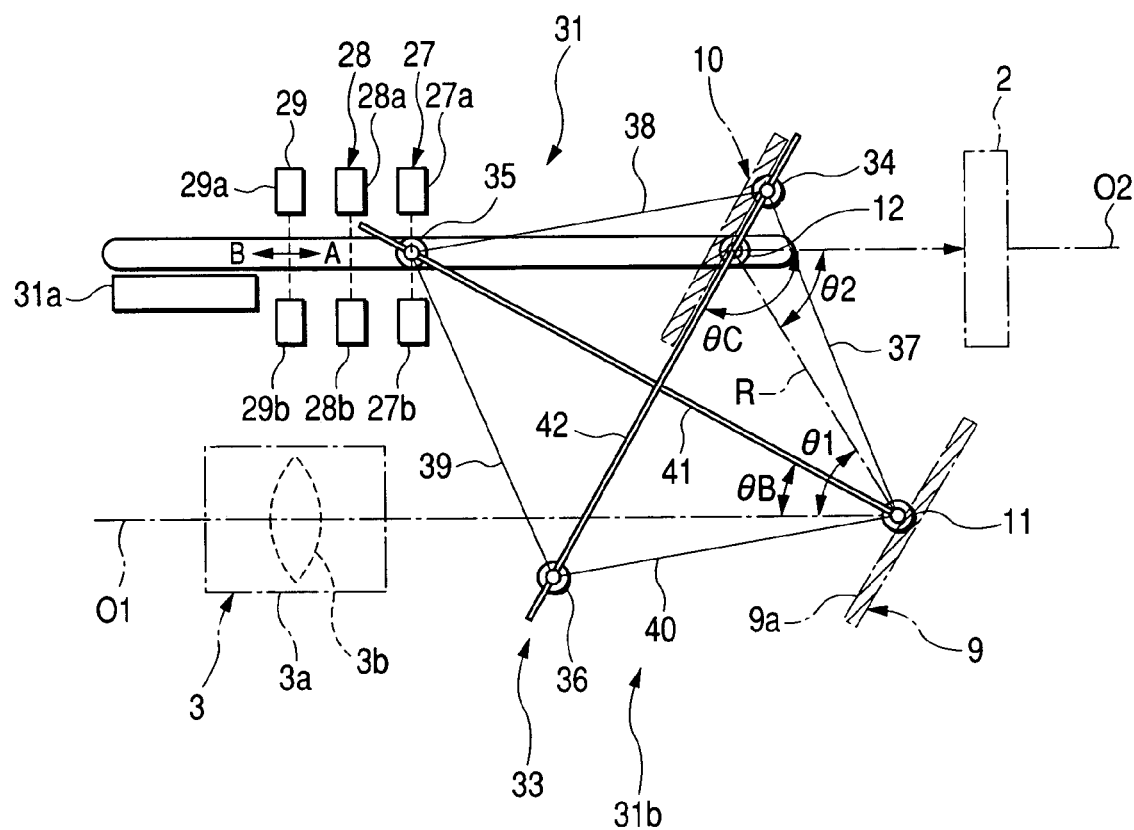
FIG. 8 is a view schematically illustrating a structure of a focal point adjusting mechanism according to a third embodiment of the present invention.

FIG. 8 illustrates a third embodiment of the present invention. In the third embodiment, the structure of a displacement mechanism 31 is different from that of each of the displacement mechanisms 14 and 21 of the first and second embodiments. In the third embodiment, the structure of a displacement mechanism 31 is different from that of the displacement mechanism 14 of the first embodiment. Explanations of other components, therefore, of the code reader according to the third embodiment are omitted or simplified. The displacement mechanism preferably serves as a cooperative mechanism according to the present invention.

In the third embodiment, the first reflector 9 and the first shaft 11 are rotatably supported to the case 1. The second shaft 12 and the second reflector 10 are slidably supported in a slidably supporting groove 32 together with each other to be rotatable therein. In the third embodiment, the slidably supporting groove 32 has a longitudinal length longer than that of the slidably supporting groove 13 of the first embodiment.

The displacement mechanism 31 has a slide mechanism 31a, schematically illustrated in FIG. 8, operative to slide the second shaft 12 long the slidably supporting groove 13, that is, along the arrows A and B in FIG. 8.

The displacement mechanism 31 has an angle adjusting mechanism 31b operative to adjust the first and second reflector angles θ1 and θ2 of the first and second reflectors 9 and 10 according to the displacement of the second reflector 10 along the second optical axis O2.

In this third embodiment, the angle adjusting mechanism 31b is provided with a link mechanism 33 having a substantially parallelogram shape.

The link mechanism 33 is provided with a first link pin 34, a second link pin 35, a third link pin 36, and first and fourth link bars 37 to 40 that are the same length. The first link bar 37 is linked to the first link pin 34 and the first shaft 11. The second link bar 38 is linked to the first link pin 34 and the second link pin 35, and the third link bar 39 is linked to the second link pin 35 and the third link pin 36. The fourth link bar 40 is linked to the third link pin 36 and the first shaft 11. That is, the first shaft 11, the first link pin 34, the second link pin 35, and the third link pin 36 are approximately circularly linked to one another by the first to fourth link bars 37 to 40, thereby providing the parallelogram-shaped link mechanism 33.

The first shaft 11 of the first reflector 9 is fixed to the case 1, and the second link pin 35 is slidably supported in the slidably supporting groove 13 along the second optical axis 02 around its center axis (rotating axis) AX2.

In particular, the slide mechanism 31a has a rack and pinion mechanism mechanically linked to the second link pin 35 and a motor coupled to the rack and pinion mechanism. The motor is electrically connected to the control circuit CC. The motor operates to supply rotation energy to the rack and pinion mechanism so that the rack and pinion mechanism causes the second link pin 35 to slide along the second optical axis O2 illustrated by the arrows A and B in FIG. 8. The first and third link pins 34 and 36 are supported to the case 1 to be displacable.

In the third embodiment, the first to third through-beam sensors 27 to 29 are operative to detect the displacement of the second link pin 35. That is, when the first photodetector 27b detects the interrupt of the directional beam by the second link pin 35, the second reflector 10 is stopped at the first stop position Pa. Similarly, when the second photodetector 28b detects the interrupt of the directional beam by the second link pin 35, the second reflector 10 is stopped at the second stop position Pb. When the second photodetector 29b detects the interrupt of the directional beam by the second link pin 35, the second reflector 10 is stopped at the third stop position Pc.

The link mechanism 33 is provided with a first diagonal shaft 41. The first diagonal shaft 41 has one end portion fixedly coupled to the first shaft 11 of the first reflector 9 and the other end portion freely penetrated through the second link pin 35 to extend therefrom. The first diagonal shaft 41 has an angle $\theta_B$ with respect to the first optical axis O1. The link mechanism 33 is also provided with a second diagonal shaft 42. The second diagonal shaft 42 has one end portion freely penetrated through the first link pin 34 to extend therefrom and the other end portion freely penetrated through the third link pin 36 to extend therefrom. The second diagonal shaft 42 is freely penetrated at its intermediate portion through the second shaft 12 of the second reflector 10 to extend therefrom. The second diagonal shaft 42 has an angle $\theta_C$ with respect to the second optical axis O2.

When the second link pin 35 is slid in the supporting groove 13 by the slide mechanism 31a, the first and third link pins 34 and 36 are displaced according to the slide of the second link pin 35 so that the position and the angle $\theta_C$ of the second diagonal shaft 42 are changed. The changes of the position and the angle $\theta_C$ of the second diagonal shaft 42 cause the second reflector 10 to be displaced and its second reflector angle θ2 to be changed.

The displacement of the second link pin 35 causes the first diagonal shaft 41 to pivot along the displacement direction of the second link pin 35. The pivot of the first diagonal shaft 41 changes the angle $\theta_B$ of the diagonal shaft 41, thereby rotating the first shaft 11 and the first reflector 9.

Similarly to the first and second embodiments, in the third embodiment, when the second reflector 10 is fixed at each of the first to third stop positions Pa to Pc, the first reflector angle θ1 is set to each of the angles θ1a to θ1c and the second reflector angle θ2 is set to each of the angles θ2a to θ2c.

The control circuit CC, as well as the first and second embodiments, controls the motor of the slide mechanism 31a to drive the rack and pinion mechanism. This control of the control circuit CC allows the rack and pinion mechanism to displace the second link pin 35 so as to stop the second reflector 10 at any one of the first to third stop positions Pa to Pc based on the detection signals transmitted from the photodetectors 27b to 29b.

The displacement of the second reflector 10 to be temporarily fixed at any one of the first to third stop positions Pa to Pc allows the first reflector angle to be set corresponding to any one of θ1a to θ1c (the first to third states (a) to (c)), and the second reflector angle to be set corresponding to any one of θ2a to θ2c (the first to third states (a) to (c)).

As a result, the displacement mechanism 31 makes it possible to adjust the optical path length between the imaging lens 3 and the photodetector 2 with each of the first and second optical axes kept constant.

As described above, the code reader according to the third embodiment provides advantages of expanding the range of its reading distance and having a comparatively simple and compact structure for adjusting the reading distance. Especially, in the third embodiment, displacement of the second link pin 35 along the second optical axis O2 by the link mechanism 33 allows the first and second reflectors 9 and 10 to rotate without using motors for rotating the first and second reflectors 9 and 10. This results in further simplifying the structure of the displacement mechanism 31.

In each of the first to third embodiments and modifications of the present invention, the second reflector is displacable along the second optical axis O2. The first reflector may be displacable along the first optical axis O1, or both the first and second reflectors may be displacable along the first and second axes, respectively.

In each of the first to third embodiments and modifications of the present invention, the first and second reflectors are used for adjusting the optical path length between the imaging lens and the photodetector the present invention, however, is not limited to the structure. That is, three or more reflectors may be arranged between the imaging lens and the photodetector for adjusting the optical path length therebetween.

In each of the first to third embodiments and modifications of the present invention, the state of each of the first and second reflectors is selectively changed from any one of the first to third states (a) to (c). The present invention, however, is not limited to the structure. That is, the state of each of the first and second reflectors may be selectively changed from any one of a plurality of predetermined states, or linearly changed.

In the first embodiment, the first reflector and the second reflector are rotated in synchronization with each other, but one of the first and second reflectors may be rotated, and the other thereof may be rotated in a follow-up to the rotation of the one of the first and second reflectors.

In each of the first and second embodiments and modifications of the present invention, the unit for measuring a positional relationship between the label P and the reading window 1a is provided so that the displacement mechanism 14 is adapted to automatically rotate each of the first and second reflectors and slide the second reflector. However, the present invention is not limited to the structure.

The user may manually operate each of the first and second reflectors to rotate and/or slide it, thereby adjusting the reading distance of a two-dimensional code reader. In this case, the unit for measuring the positional relationship between the label P and the reading window 1a is not necessarily provided for the two-dimensional code reader CR so that the user may determine the positions of the optical member 6 by eye. The measurement result obtained by the measuring unit may be displayed on, for example, the display. The structure of the measuring unit and that of the drive unit may be variably modified.

The present invention is not limited to the structure of each of the first to third embodiments and modifications of the present invention. That is, such a code reader according to the present invention may be previously installed in a system such as FA (Factory Automation) system. The method and apparatus according to the present invention are not applied only to read the two-dimensional code. The method and apparatus according to the present invention may be applicable for reading a barcode or other information. Modifications of the unit for measuring a positional relationship between the label P and the reading window 1 may be applied for the present invention within the scope of the present invention. Modifications of the focal length adjusting mechanism may be applied for the present invention within the scope of the present invention.

While there has been described what is at present considered to be these embodiments and modifications of the present invention, it will be understood that various modifications which are not described yet may be made therein, and it is intended to cover in the appended claims all such modifications as fall within the true spirit and scope of the invention.

What is claimed is:

1. An apparatus for optically reading a target based on light reflected from the target, said apparatus comprising:
   an imaging lens with a first optical axis, the reflected light entering into the imaging lens;
   a photodetector having an active area and a second optical axis, the imaging lens focusing the reflected light on the active area of the photodetector;
   a first reflector disposed on the first optical axis;
   a second reflector disposed on the second optical axis, the first and second reflectors being opposite to each other, each of the first and second reflectors folding an optical path of the reflected light between the imaging lens and the photodetector; and
   an adjusting mechanism configured to adjust a length of the optical path of the reflected light between the imaging lens and the photodetector while keeping each of the first and second optical axes constant by: changing a first reflector angle of the first reflector, a second reflector angle of the second reflector, and an interval between the first and second reflectors along the first optical axis, the first reflector angle representing a sum of an incident angle of the reflected light to the first reflector and a reflection angle thereof from the first reflector, the second reflector angle representing a sum of an incident angle of the reflected light to the second reflector and a reflection angle thereof from the second reflector.

2. An apparatus according to claim 1, wherein said adjusting mechanism rotatably supports one of said first and second reflectors to be displacable along corresponding one of the first and second optical axes, and rotatably supports the other thereof.

3. An apparatus according to claim 2, wherein said first and second optical axes are parallel to each other, and said adjusting mechanism operates to displace the one of the first and second reflectors along corresponding one of the first and second optical axes and to rotate the first and second reflectors to change the first and second reflector angles while keeping the first and second optical axes parallel to each other.

4. An apparatus according to claim 3, wherein said adjusting mechanism operates to rotate the one of the first and second reflectors, thereby changing corresponding one of the first and second reflector angles and to rotate the other thereof thereby changing corresponding the other of the first and second reflector angles either in synchronization with the rotation of the one of the first and second reflectors or in a follow-up to the rotation of the one of the first and second reflectors.

5. An apparatus according to claim 4, wherein said adjusting mechanism has a first motor and a second motor rotatably supporting the first reflector and the second reflector, respectively, and operates to stop the displacement of the one of the first and second reflectors at any one of a predetermined positions, and said first and second motors operate to stop the rotations of the first and second reflectors when each of the first and second reflector angles becomes to any one of a plurality of predetermined angles, said predetermined angles corresponding to said predetermined positions, respectively.

6. An apparatus according to claim 4, wherein said adjusting mechanism has a first motor and a second motor rotatably supporting the first reflector and the second reflector, respectively, said first and second motors rotating the first and second reflectors in synchronization with each other to change the first and the second reflector angles, respectively.

7. An apparatus according to claim 3, wherein said adjusting mechanism comprises a cooperative mechanism mechanically coupled to the first and second reflectors and configured to rotate the one of the first and second reflectors according to the displacement of the one of the first and second reflectors, said cooperative mechanism rotating the other of the first and second reflectors according to the rotation of the one of the first and second reflectors.

8. An apparatus according to claim 7, wherein said cooperative mechanism has a connecting member connecting the first and second reflectors and having an angle with respect to the other of the first and second optical axes, said angle of the connecting member with respect to the other of the first and second optical axes being changed according to the displacement of the one of the first and second reflectors, and said cooperative mechanism has a gear mechanism coupled to the first and second reflectors and the connecting member, said gear mechanism converting the change of the angle of the connecting member into a rotation force and rotating the first and second reflectors based on the converted rotation force.

9. An apparatus according to claim 7, wherein said cooperative mechanism has a link mechanism having a first link portion linked to the first reflector and a second link portion linked to the second reflector, said first link member having a first angle with respect to the first optical axis, said second link member having a second angle with respect to the second optical axis, said first and second angles being changed according to the displacement of the one of the first and second reflectors, and said link mechanism converts the changes of the first and second angles of the first and second link members into rotation forces and rotating the first and second reflectors based on the converted rotation forces.

10. An apparatus according to claim 1, further comprising:
    a body case containing the imaging lens, the photodetector, the first and second reflectors, and the adjusting mechanism therein, said body case having a reading window through which the reflected light enters in the body case, said reading window being located on the first optical axis to be opposite to the imaging lens;
    a unit for measuring a positional relationship between the reading window and the target; and
    a control circuit electrically connected to the measuring unit and the adjusting mechanism and configured to control the adjusting mechanism based on the measured positional relationship between the reading window and the target.

11. An apparatus according to claim 1, wherein the adjusting mechanism satisfies the expression where the first and second reflectors are set at predetermined positions:

$$\theta 1 = \theta 2 = \arctan(Y/X), \text{ wherein}$$

$\theta 1$ = the first reflector angle,
$\theta 2$ = the second reflector angle,
X = interval between the first reflector and the second reflector along with the optical axis, and
Y = interval between two axes, one axis with regard to the first reflector and the other axis with regard to the second reflector.

12. A method of optically reading a target based on light reflected from the target, wherein said reflected light enters into an imaging lens with a first optical axis so that the imaging lens focuses the reflected light on an active area of a photodetector having a second optical axis, said method comprising:
    (a) providing a first reflector to be disposed on the first optical axis;
    (b) providing a second reflector to be disposed on the second optical axis, the first and second reflectors being opposite to each other;
    (c) folding an optical path of the reflected light between the imaging lens and the photodetector using the first reflector;
    (d) folding the optical path of the reflected light folded by the folding in (c) using the second reflector; and
    (e) adjusting a length of the optical path of the reflected light between the imaging lens and the photodetector while keeping each of the first and second optical axes constant by:
        changing a first reflector angle of the first reflector, a second reflector angle of the second reflector, and an interval between the first and second reflectors along the first optical axis, the first reflector angle representing a sum of an incident angle of the reflected light to the first reflector and a reflection angle thereof from the first reflector, the second reflector angle representing a sum of an incident angle of the reflected light to the second reflector and a reflection angle thereof from the second reflector.

* * * * *